United States Patent [19]

Haebler et al.

[11] Patent Number: 4,743,269

[45] Date of Patent: May 10, 1988

[54] PROCESS FOR PREPARING NAVY DYEINGS ON POLYESTER FIBERS USING MIXTURE OF BLUE AND RED AZO DYES

[75] Inventors: Wolfgang Haebler, Odenthal; Heinz Geiger, Bergisch Gladbach; Hans-Günter Otten, Leverkusen; Horst Brandt, Odenthal, all of Fed. Rep. of Germany

[73] Assignee: Bayer Aktiengesellschaft, Leverkusen, Fed. Rep. of Germany

[21] Appl. No.: 942,138

[22] Filed: Dec. 16, 1986

[30] Foreign Application Priority Data

Dec. 20, 1985 [DE] Fed. Rep. of Germany ....... 3545459

[51] Int. Cl.$^4$ .................. C09B 67/22; D06P 3/36; D06P 1/04
[52] U.S. Cl. ................................. 8/639; 8/693; 8/696; 8/922
[58] Field of Search .......................... 8/639

[56] References Cited

U.S. PATENT DOCUMENTS

| 3,635,941 | 1/1972 | Weaver et al. | 8/695 |
| 3,639,384 | 2/1972 | Weaver et al. | 8/691 |
| 3,763,141 | 10/1973 | Weaver et al. | 8/694 |
| 4,678,476 | 7/1987 | Tappe et al. | 8/639 |
| 4,689,050 | 8/1987 | Hahnke et al. | 8/639 |

FOREIGN PATENT DOCUMENTS 1080480 8/1967 United Kingdom .

Primary Examiner—A. Lionel Clingman
Attorney, Agent, or Firm—Sprung Horn Kramer & Woods

[57] ABSTRACT

Navy polyester dyeings which are produced by means of dyestuff mixtures based on azo dyestuffs from 2,4-dinitro-6-cyanoaniline and 3-acylamino-dialkylaminoanilines are distinguished by a very good wash fastness on using peroxide-containing domestic washing agents. Preferably the dyestuff formulations used contain a weakly acidic buffer system.

5 Claims, No Drawings

PROCESS FOR PREPARING NAVY DYEINGS ON POLYESTER FIBERS USING MIXTURE OF BLUE AND RED AZO DYES

The invention relates to a process for preparing wash-fast navy dyeings on fibre materials which consist wholly or partly of polyester, after a thermal treatment.

It is common knowledge that dyeings of polyester textile materials have poor wet fastness properties, in particular an inadequate wash fastness at 60° C. with domestic washing agents as per DIN No. 54 017, as a consequence of a subsequent customary heat treatment (for example heat-setting at 180° C. ).

This undesirable phenomenon is attributed to the fact that virtually all commercially available disperse dyestuffs tend to thermomigrate. The dyestuff which accumulates at the fibre surface as a result of the heat treatment is detached in the course of the wash and dyes the adjacent fabrics used in that standard test to a greater or lesser extent.

This disadvantageous effect is particularly noticeable in the case of navy dyeings of textured polyester or polyester/cotton materials for, for example, sportswear articles. These articles, as is known, are frequently trimmed, for decoration, with white fabric sections made of the same or another (for example polyamide) fibre material, which are then stained in the wash.

It has therefore already been proposed to avoid fastness losses through thermomigration by treating the dyed material before the heat-setting with selected auxiliaries based on polysiloxanes and organotin compounds (for example CYCLANON ® 5708/5709 from BASF).

Apart from the fact that this process is not universally applicable to all commercially available dyestuffs and to the commercially significant polyester/cotton articles, its relatively expensive implementation (the treatment baths must always be made up fresh) and the chemicals, which are not exactly inexpensive, add to the dyeing costs.

It has now been found, surprisingly, that these disadvantages can be removed and, by using peroxide-containing washing agents, satisfactory wash results can be obtained by dyeing the fibre materials mentioned with navy dyestuff mixtures which contain as the blue component at least one dyestuff of the formula

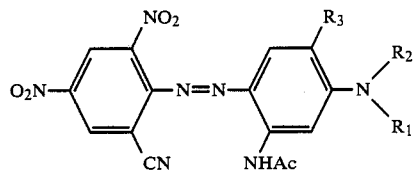

(I)

in which
AC denotes an acyl radical,
$R_1$ denotes an alkyl or alkoxyalkyl radical
$R_2$ denotes $R_1$ or an aralkyl radical and
$R_3$ denotes $R_1$, hydrogen an alkoxy radical or—together with $R_2$—an alkylene group.

Suitable acyl radicals are those of the formula —COR in which R denotes hydrogen, $C_1$–$C_5$-alkyl, optionally $C_1$–$C_4$-alkyl-, $C_1$–$C_4$-alkoxy- or Cl-substituted phenyl or thienyl.

Suitable alkyl and alkoxy radicals are those having 1-4 C atoms. Suitable aralkyl radicals are $C_1$–$C_4$-alkyl-phenyl radicals which can be substituted in the phenyl nucleus as stated above.

Suitable alkylene radicals which can be formed by $R_2$ and $R_3$ together through cyclization are those having 2 to 3 chain members. Preference is given to the radical

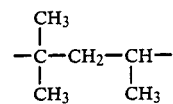

Preferred dyestuffs are those of the formula I in which
Ac stands for acetyl, propionyl, n/i-butyryl or benzoyl,
$R_1$ stands for ethyl, n-propyl, n-butyl or methoxy(ethoxy)ethyl,
$R_2$ stands for $R_1$, benzyl or phenylethyl and
$R_3$ stands for H or methoxy.

The dyestuffs to be used according to the invention in the navy mixtures produce on polyester fibre materials after a thermal treatment (for example 30 sec. 180° C.) wash fastness properties of at least 4 in accordance with DIN No. 54 017.

This effect was not in any way foreseeable, since structurally very similar, commercially available dyestuffs such as, for example, dyestuffs of the formula I in which the 2-nitro group in the diazo component is replaced by a CN group, or the dyestuffs of the formula I in which $R_1$ stands for hydrogen, which are likewise not claimed here, give significantly worse wash fastness properties under the abovementioned conditions.

The blue dyestuffs to be used according to the invention are known per se and are described for example in the following patent literature: DE-A-1,923,592, DE-A-2015,351, DE-A-1,644,141. The preparation of the navy mixture is effected in a likewise known manner by "dulling" these blue dyestuffs with appropriate red disperse dyestuffs.

Suitable red components are in particular azo dyestuffs of the formula

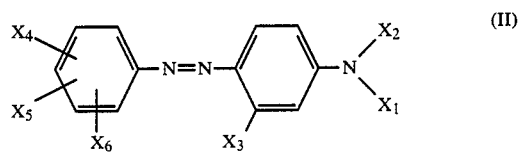

(II)

in which
$X_1$ stands for a radical of the formula $CH_2CH_2COOZ$ or

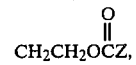

$X_2$ stands for $X_1$, alkyl or $CH_2CH_2CN$,
$X_3$ stands for H or alkyl, preferably $CH_3$,
$X_4$ stands for $NO_2$ or COOZ,
$X_5$ stands for H, Cl or Br and
$X_6$ stands for $X_5$,
where
Z denotes aryl, aralkyl, cycloalkyl and in particular alkyl,
where the hydrocarbon radicals mentioned have the abovementioned preferred meanings.

Particularly preferred dyestuffs are yellowish reds of the formula II in which $X_1$ stands for $CH_2CH_2COOZ$, $X_6$ stands for H, $X_4$ stands for $NO_2$ and Z stands for alkyl.

Preferably, to prepare the navy mixtures, the blue dyestuffs of the formula I are used in the form of those preparations which contain a non-reducing and non-oxidizing buffer system (for example phosphate buffer) which, on introduction of the preparation into the dyebath, establishes a weakly acidic pH range (for example pH 4.5–6.0).

Suitable fibre materials to be dyed are polyesters in the widest sense of the word, thus including, for example, cellulose esters. Preference is given to aromatic polyesters of the polyethylene terephthalate type and their mixtures with cotton.

In the examples below, "parts" are by weight.

EXAMPLES

EXAMPLE 1

100 parts of knitwear consisting of textured polyester are treated in a jet dyeing machine with a dyeing liquor which consists of 2.97 parts of the blue dyestuff A in finished form
0.35 part of the red dyestuff A in finished form
1 part of dispersant
2 parts of acetic acid and
993 parts of water.

The liquor is heated up rapidly to 80° C. and from 80° C. to 130° C. in the course of 30 min. 130° C. is maintained for 20 min. Cooling down is as usual followed by rinsing and an alkaline reduction clear at 70° C. for 20 min.

The result obtained is a level deep navy dyeing. This dyeing has excellent rub and web fastness properties, even when the dyeing is subjected to a subsequent heat-setting at 180° C. for 30 sec. The thermomigration fastness is tested on the subsequently heat-set dyeing by a wash at 60° C. against multifibre in accordance with DIN No. 54017.

The assessment criterion is the staining of polyamide on the grey scale 1–5. By this test method, the above dyeing is rated 4–5.

EXAMPLE 2

Similar results are obtained by using, in place of the dyestuff A, the dyestuff B.

EXAMPLE 3

Similar results as in Example 1 are obtained by using, in place of the dyestuff A, the dyestuff C.

The dyestuffs mentioned in the preceding examples have the following formulae:

(A)

(B)

(C)

(D)

EXAMPLE 4

A commercial dyestuff preparation was prepared as follows:

A mixture of 16 parts of a dyestuff A ("crude dye")
40.8 parts of dispersant (condensation product of naphthalenesulphonic acids + formaldehyde)
31.4 parts of dispersant (condensation product of ditolyl ether + formaldehyde)
6.2 parts of $NaH_2PO_4$
0.1% of wetting and defoaming agent
0.5% of dedusting agent
5 parts of water is bead-milled and subsequently spray-dried.

What is claimed is:

1. Process for preparing wash-fast navy dyeings on fibre materials which consist wholly or partly of polyester, after thermal treatment, characterized in that
   (a) as the blue component at least one dyestuff of the formula in which
Ac denotes an acyl radical,
$R_1$ denotes an alkyl or alkoxyalkyl radical,
$R_2$ denotes $R_1$ or an aralkyl radical and
$R_3$ denotes $R_1$, hydrogen, an alkoxy radical or together with $R_2$—an alkylene group,
   (b) as the red component at least one dyestuff of the formula

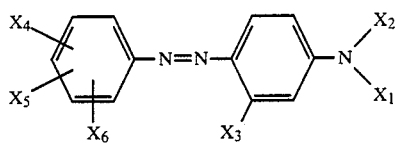

in which
X$_1$ stands for a radical of the formula

X$_2$ stands for X$_1$, alkyl or CH$_2$CH$_2$CN,
X$_3$ stands for H or alkyl,
X$_4$ stands for NO$_2$ or COOZ,
X$_5$ stands for H, Cl or Br and
X$_6$ stands for X$_5$,
where
Z denotes alkyl, said alkyl radicals having 1-4 C-atoms.

2. Process according to claim 1, characterized in that the blue component used is a dyestuff of the indicated formula in which
Ac stands for acetyl, propionyl, n/i-butyryl or benzoyl,
R$_1$ stands for ethyl, n-propyl, n-butyl or methoxy(ethoxy)ethyl,
R$_2$ stands for R$_1$, benzyl or phenylethyl and
R$_3$ stands for H or methoxy.

3. Process according to claim 1, characterized in that the blue component used is a dyestuff of the formula

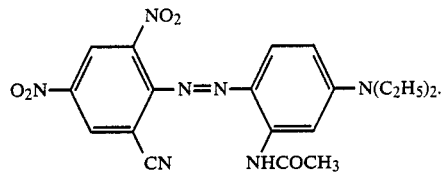

4. Process according to claim 1, characterized in that in addition to the blue dyestuff the red dyestuff of the formula

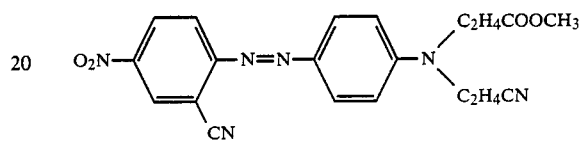

is used.

5. Process according to claim 1, characterized in that the dyestuffs are used in the form of those preparations which contain a non-reducing or non-oxidizing buffer system for producing a weakly acidic pH range.

* * * * *

UNITED STATES PATENT AND TRADEMARK OFFICE
CERTIFICATE OF CORRECTION

PATENT NO. : 4,743,269

DATED : May 10, 1988

INVENTOR(S) : Wolfgang Haebler, et al

It is certified that error appears in the above-identified patent and that said Letters Patent is hereby corrected as shown below:

Col. 4, line 48    Before "(a)" insert --use is made of dyestuff mixtures which contain--

Signed and Sealed this

Third Day of January, 1989

Attest:

DONALD J. QUIGG

*Attesting Officer*    *Commissioner of Patents and Trademarks*